United States Patent [19]

Flynn

[11] Patent Number: 5,363,589
[45] Date of Patent: Nov. 15, 1994

[54] FLY CATCHER

[76] Inventor: William E. Flynn, 12916 Second Ave. S., Burnsville, Minn. 55337

[21] Appl. No.: 89,020

[22] Filed: Jul. 9, 1993

[51] Int. Cl.⁵ .............................................. A01M 1/00
[52] U.S. Cl. ........................................ 43/122; 43/107
[58] Field of Search ................................ 43/107, 122

[56] References Cited

U.S. PATENT DOCUMENTS

| | | | |
|---|---|---|---|
| 161,814 | 4/1875 | Nelson | 43/122 |
| 464,343 | 12/1891 | Nile | 43/107 |
| 882,306 | 3/1908 | Fredrickson . | |
| 983,977 | 2/1911 | Lilge . | |
| 1,102,642 | 7/1914 | Brown | 43/122 |
| 1,107,091 | 8/1914 | Mielke . | |
| 1,184,486 | 5/1916 | Myers | 43/107 |
| 1,185,935 | 6/1916 | Pugh . | |
| 1,715,958 | 6/1929 | Strand | 43/107 |
| 2,478,104 | 8/1949 | Johnson | 43/122 |
| 3,820,273 | 6/1974 | Novak . | |
| 4,103,449 | 8/1978 | Vasquez . | |
| 4,244,135 | 1/1981 | Harwoods . | |
| 4,551,941 | 11/1985 | Schneidmiller | 43/122 |
| 4,738,049 | 4/1988 | Baley . | |
| 5,231,791 | 8/1993 | Falkson | 43/122 |
| 5,231,792 | 8/1993 | Warner | 43/122 |

FOREIGN PATENT DOCUMENTS 159318  8/1904  Germany .............................. 43/122

Primary Examiner—Kurt C. Rowan
Attorney, Agent, or Firm—Robert C. Baker

[57] ABSTRACT

This fly catcher features a mating relationship between the tapered passageway of the fly entry path and the capture chamber that permits the capture chamber to be entirely separated from the passageway for easier cleaning of the catcher. The passageway is comprised of upper and lower conical wall portions so that each wall portion may have a different slope which allows the slope of each wall portion to be designed to maximize the width of the bottom entrance mouth of the passageway and minimize the width of the top exit port of the passageway without causing the height of the passageway (or the fly catcher) to become exceedingly tall.

11 Claims, 1 Drawing Sheet

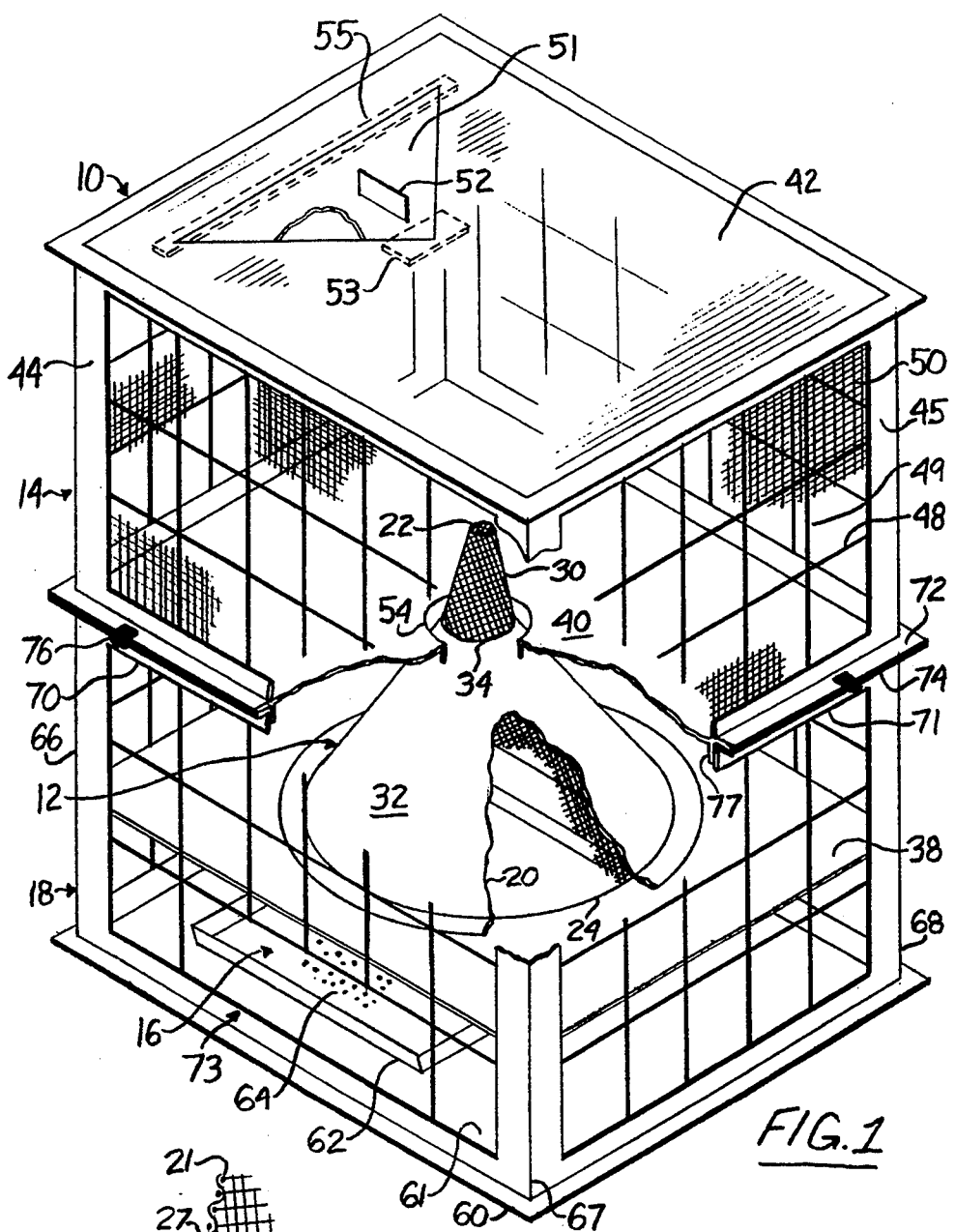
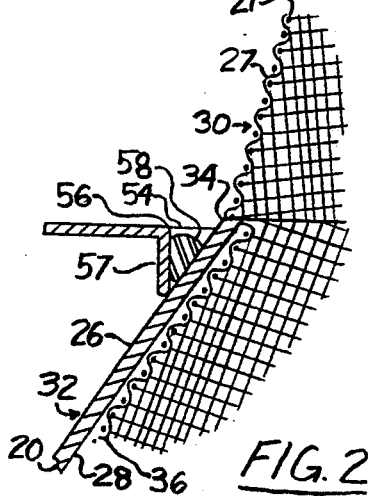
FIG. 1
FIG. 2

FLY CATCHER

BACKGROUND OF THE INVENTION

This invention relates to a fly catcher, and more particularly to a fly catcher having new and useful structural relationships for the fly entrance structure and the chamber for confining the captured flies.

Various fly trapping devices have heretofore been proposed to attract, capture and hold flies and other flying pests. Utilizing the knowledge that flies will commonly fly upward after feeding, these devices have often employed a conical or similarly shaped passageway with a bottom opening positioned above some bait. Flies rising from the bait enter the bottom opening of the passageway and the passageway guides their movement toward the top opening and into a capture chamber.

Optimum effectiveness of a passageway as a funnel for taking in as many flies as possible as they rise from bait requires a large mouth entrance opening for the passageway. This in the past has meant a relatively shallow slope for the conical passageway so as to avoid exceedingly tall fly catching devices. The shallow slope provides a relatively reduced height between the bottom entrance for the passageway and its exit within the capture chamber. The benefit of a more vertical slope in terms of enticing and entrapping flies within a capture chamber thus has been compromised in past devices where the advantage of a large mouth opening and reasonable total height for the fly catcher have been desired. Other characteristics of past devices have unified the passageway to parts of the capture chamber and have exacerbated the problem of cleaning the flycatchers.

The present invention provides an entirely new approach to the design of fly catchers.

SUMMARY OF THE INVENTION

The invention provides a fly catcher which comprises a vertically-oriented tapered passageway which is defined by a surrounding wall having an outer side. The passageway has top and bottom openings which define its height. The top opening is an exit port at the top end of the upper portion of the passageway and has a minimum width in all directions that is sufficiently large to permit the movement of a fly therethrough but does not exceed about one centimeter (cm) in any direction (preferably not over a half cm in any direction). The bottom opening is an entrance mouth at the bottom end of the lower portion of the passageway and has a width in all directions of at least about 10 cm (preferably over 12 cm). Means are provided to support the entrance mouth in an elevated condition to allow flies to move from an external location through the mouth into the passageway.

The flycatcher also includes a capture chamber for confining flies within it. The chamber has a floor which preferably is substantially horizontal and has an aperture therein at a central portion thereof. The upper portion of the passageway traversed by flies extends through the aperture so that the exit port is spaced above the floor. A fly-impenetrable interface is formed between the aperture and the outer side of the passageway. The entrance mouth is spaced below the floor. The chamber as a unit is entirely separable from the passageway per se for cleaning purposes.

The passageway of the invention is preferably comprised of upper and lower different conical wall portions oriented about a common vertical axis and united together at a juncture lying approximately in the plane of the floor of the capture chamber. The slope of the upper conical wall portion is preferably more vertical than the slope of the lower conical wall portion. The upper and lower conical wall portions are preferably comprised of screen material, and the wall of the lower conical portion also may include a continuous layer of material surrounding the screen so that the screen forms a lining on the inner continuous surface of the continuous layer.

The capture chamber preferably includes a ceiling spaced above the floor with a removable hatch integrated therein for access to the interior of the chamber. Also, a bait surface is preferably provided below the entrance mouth of the passageway.

Still other features and details and advantages of the invention will be evident as this description proceeds.

BRIEF DESCRIPTION OF THE DRAWINGS

FIG. 1 is a schematic perspective view of the fly catcher of the invention, with portions broken away to show underlying detail; and FIG. 2 is a schematic vertical sectional view showing detail for a preferred mating interface between the aperture in the floor of the capture chamber and the tapered passageway, with parts broken away.

DESCRIPTION OF THE PREFERRED EMBODIMENT

Referring to FIG. 1, the fly catcher 10 has a vertically-oriented tapered passageway 12 with an exit port 22 which extends into the interior of a capture chamber 14. The passageway 12 also has an entrance mouth 24 that is supported in an elevated condition above a bait surface 16 by a supporting structure 18 which suitably may also provide the prime support for the capture chamber 14.

The tapered passageway 12 guides flies into the capture chamber 14 when they fly or otherwise move upwards after feeding on bait placed on the bait surface 16. The passageway is defined by a surrounding wall 20 which may be comprised of continuous (e.g., a solid layer without holes) or discontinuous (e.g., a layer of screen mesh) material to form a fly-impenetrable boundary or perimeter around the fly entrance path or passageway to the chamber 14. The wall 20 has opposite outer 26 and inner 28 sides (see FIG. 2). The preferred shape of the surrounding wall 20 is substantially conical with a small portion of the cone's tip removed to form an opening.

The vertically-oriented conical passageway 12 has a top opening and a bottom opening. The bottom opening forms an entrance mouth 24 for flies entering the passageway while the top opening forms an exit port 22 for flies leaving the passageway and entering the capture chamber 14. The width of each opening is the distance between the opposing portions of the surrounding wall 20 at the particular opening. For the preferred conical shape, the width of the opening coincides with the diameter of the opening. The exit port 22 has a minimum width in all directions that is sufficiently large to permit the movement of a fly (e.g., a housefly) through the exit port 22 but the width should not exceed one cm and preferably not exceed about a half cm in any direction. The entrance mouth has a width in all directions of at least about 10 cm, preferably at least 12 cm; and while its maximum width in all directions generally will not exceed about 30 cm, the possibility exists for even larger widths for effective entraining of flies and avoidance of excessive height for the fly catcher. In the illustrative embodiment, the exit port 22 is about 0.5 cm wide and the entrance mouth 24 is about 12 cm wide. The ratio of the width of the entrance mouth to the width of the exit port is generally within the range of about 15:1 to 75:1 and preferably within the range of about 20:1 to 60:1, with the illustrative embodiment having a ratio of about 25:1.

The distance between the top and bottom openings (i.e., port 22 and mouth 24) defines the height of the passageway 12. The passageway height most ideally lies within the range of 75% to 125% of the height of the capture chamber (discussed below), and in the preferred embodiment is about equal to the chamber's height.

The entrance mouth 24 of the passageway 12 is supported by the support structure 18 so that the mouth 24 is held in an elevated condition above the bait surface 16 to allow flies to move (e.g., fly) into the mouth 24 of the passageway from a location external to the passageway. The distance between the entrance mouth 24 and the bait surface 16 is generally between about 25% to 60% of the diameter of the mouth 24 and in the preferred embodiment is about 50% of the mouth's diameter. Flies moving or flying upward after feeding on the bait below the passageway 12 will thus enter the gaping mouth 24, continue to fly or crawl upward toward the exit port 22 and then crawl out into the capture chamber 14.

A significant feature of the preferred fly catcher 10 is the division of the surrounding wall 20 of the passageway 12 into upper 30 and lower 32 conical portions which are oriented about a common vertical axis and united together at the juncture 34. The upper surrounding wall 21 (see FIG. 2) of the upper conical portion 30 preferably has a more vertical slope than the lower surrounding wall 20 of the lower conical portion 32. A distinct slope angle for each conical portion is formed between the inner side of the particular conical portion and the vertical axis of the passageway 12. The slope angle of the upper conical portion 30 preferably lies between about 10 to 20 degrees and the slope angle of the lower conical portion 32 preferably lies between about 25 to 50 degrees. In the illustrated embodiment, the slope angle of the upper portion 30 is about 15 degrees and the slope angle of the lower portion 32 is about 35 degrees.

The surrounding wall 21 of the upper conical portion 30 is preferably comprised of conventional screen or mesh material (e.g., of metal or nylon or fiberglass, etc.) having holes or openings that are too small for flies to penetrate but large enough to allow free air flow. The surrounding wall 20 of the lower conical portion 32 is preferably comprised of a continuous or solid layer which may be and preferably is translucent but also may be, if desired, opaque or transparent. Suitable plastics such as polyethylene or polystyrene may form the solid wall 20. A lining 36 of screen mesh material on or adjacent the inner continuous surface or side 28 of solid wall 20 is ideally employed and provides a better surface for flies to alight upon and crawl towards the exit port 22. Where desired, the wall of the lower portion may consist solely of screen mesh material (i.e., with solid wall 20 omitted).

The capture chamber 14 of the invention confines or holds the flies that have entered the interior of the chamber via the exit port 22 of the passageway 12. The chamber 14 preferably has a box-like configuration with a substantially horizontal floor 40 and a substantially horizontal ceiling 42 spaced above the floor. Both the floor 40 and ceiling 42 may be formed of a translucent or an opaque material (e.g., any suitable plastic). However, the ceiling 42 is preferably comprised of a transparent or translucent material to permit easy viewing of the interior of the chamber 14 and the upper conical portion 30. The distance between the floor 40 and the ceiling 42 defines the height of the chamber 14. The chamber is surrounded by side walls extending between the floor 40 and the ceiling 42. Corner posts or columns 44 and 45 and a pattern of crisscrossed or intersecting elongated horizontal 48 and vertical 49 bars or beams form the frame for the side walls. The bars 48, 49 are arranged to form a planar grid having relatively large open spaces or voids between the bars. A fly-impenetrable screen material 50 completes the structure of the chamber side walls and extends as a covering over the open spaces of the grid formed by the bars 48, 49.

A hatch door 51 is integrated into the chamber ceiling 42 and is supported by hatch supports 53 and 55. The hatch door 51 may be removed by using a handle 52. Dead flies may be removed from the interior of the chamber through the hatch opening and cleaning of the chamber interior may be accomplished through the hatch opening.

A significant feature of the capture chamber 14 of the invention is the mating relationship that exists between the chamber 14 and the passageway 12. The aperture 54 (centrally located in the floor 40) permits the upper portion 30 of the passageway to extend through the floor 40 into the chamber 14 interior. The exit port 22 is thus spaced well above the floor 40 while the entrance mouth 24 is spaced well below the floor. The passageway 12 preferably extends or protrudes a sufficient distance into the chamber 14 so that the juncture 34 (between the upper and lower conical portions of the passageway) lies in approximately the same plane as the floor 40. Thus the upper conical portion 30 is substantially inside the chamber interior and the lower conical portion is below and outside the chamber, The spacing or distance between the exit port 22 and the floor 40 should usually be at least equal to or greater than the width of the aperture 54 and usually will account for at least about 20% but not more than about 80% of the height of the chamber 14 between the ceiling and the floor.

The aperture 54 mates against the outer side 26 of the passageway 12 sufficiently to form a fly-impenetrable interface. The perimeter edge 56 of the aperture may have a perimeter skirt 57 depending from it that contacts or mates against the outer side 26 of the passageway 12. The fly-impenetrable sealing effect of the interface is preferably enhanced by a strip 58 of yieldable or compressible gasket material (such as foamed rubber or the like) fixed to the perimeter skirt 57 or edge 56 so as to press against the outer side 26 of the passageway. The interface between the aperture 54 and the outer side 26 is releasable to permit the chamber 14 to be lifted off and entirely separated from the passageway. This feature allows the chamber 14 to be handled as a separate unit without disturbing the fly-attracting lower base portion during times of removing dead flies and cleaning the capture chamber. The aperture 54 in the floor may be employed as the only access opening for removing flies from and cleaning of the capture chamber, if desired. However, greater ease of emptying flies from and cleaning of the chamber arises when the hatch door 51 is included as part of the structure.

The supporting structure 18 supports the entrance mouth 24 of the tapered passageway 12 in an elevated condition above the bait surface 16 and also, in the illustrated embodiment, supports the perimeter of the floor of the capture chamber 14. The illustrated support structure 18 has a configuration similar to the box-like capture chamber 14. The structure 18 includes a rectangular base 60 that is designed to rest on a horizontal surface. The fly-attracting bait 64 may be placed directly upon the bed portion 61 of the base 60, but is preferably placed on a bait pan 62 that is set on the bed 61 so as to be removable from the catcher 10 for simplified cleaning and bait replacement. In either event, the bait surface 16 holds the bait 64. Corner posts or spaced vertical columns 66, 67, 68 have lower ends fixed to the outer edges of the base 60. The upper ends of the vertical columns are joined together by a rectangular frame of horizontal beams 70, 71. The sides of the supporting structure 18 preferably include a grid of intersecting elongated vertical and horizontal bars similar to those of the capture chamber. An enlarged opening 73 in the grid may be employed for easier insertion of a bait pan 62 into the structure 18 to rest on the bed 61.

The supporting structure 18 functions also to support the passageway 12. It does this through a flange-like portion 38. The entrance mouth 24 of passageway 12 has a circumferential rim that is united to the planar flange-like portion 38. The flange-like portion 38 is preferably constructed of an opaque or translucent or transparent material (e.g., a plastic material) and extends radially outward from the rim in a generally horizontal direction. The corners of the flange-like portion 38 may be supported by the vertical columns 66, 67, 68 on vertical stops (not shown) that are formed on the inward-facing sides of the vertical columns. Such an arrangement permits the passageway 12 and the flange-like portion 38 to be lifted out of the supporting structure 18 after the capture chamber 14 has been removed. This feature facilitates cleaning. However, the corners of the flange-like portion 38 may be permanently fixed in the structure 18, as desired.

The capture chamber 14 is adapted to removably rest upon the frame formed by the horizontal beams 70, 71 at the top of the support structure 18. The periphery of the floor 40 has a horizontally-protruding peripheral flange 72 that corresponds to a similar horizontal flange 74 which protrudes from the outer sides of the support structure's horizontal beams 70, 71. When the capture chamber 14 is set upon the horizontal beams 70, 71 of the support structure 18, the peripheral flange 72 and the horizontal flange 74 are in parallel contact with each other around the entire catcher 10. The flanges 72 and 74 may then be held together by a number of C-shaped clips 76 whose leg portions are biased together to create a pinching effect. A clip 76 is preferably located on each side of the catcher 10 to secure the structure 18 and the chamber 14 together. A depending lip flange 77 on the floor of the capture chamber may be employed to facilitate proper registration of the capture chamber peripheral flange 72 over the support structure horizontal flange 74.

The bifurcation of the passageway 12 into two conical wall portions permits the catcher 10 to avoid the compromises made by previous passageway designs having only one conical portion and allows the slope and opening width of each conical portion to be optimized to its function. With regard to the lowermost opening width, a passageway has optimal effectiveness when the entrance mouth 24 is made as wide as is practical to cover as much area around the bait as possible in order to increase the likelihood that all flies ascending from the bait will move into the mouth. Conversely, the exit port should be made as small as practical in order to reduce the possibility that a fly confined within the capture chamber will discover the exit port and crawl through it to escape from the chamber.

With regard to the wall slope, a more vertical slope is more effective in guiding flies toward the upper exit port. Also, a more vertical slope can extend higher into the capture chamber and thus discourage flies already inside the capture chamber from landing upon and climbing up the outer side of the passageway to discover the exit port for possible escape. On the other hand, a more vertical wall slope increases the height necessary for the passageway when the mouth is ideally large and the exit port is ideally small. A more horizontal wall slope will decrease the height of the passageway when the mouth width is maximized and the exit port width is minimized, but the passageway's effectiveness in guiding the flies toward the exit port appears to be decreased and the possibility of escape from the capture chamber appears to be increased. A more horizontal wall slope also tends to decrease the spacing or distance between the exit port and the floor of the capture chamber, which diminishes the capacity of the chamber for holding fly bodies without clogging the exit port.

Thus the invention beneficially permits the slope angle of each conical passage portion to be optimized for its function. The slope of the lower conical portion 32 is made larger or less vertical than the slope of the upper conical portion 30 in order to increase the width of the entrance mouth 24 (and therefore maximize the area covered around the bait) while minimizing the height necessary for the lower portion 32. The slope angle of the upper conical portion 30 is made smaller or more vertical in order to enhance fly movement into the capture chamber and also to extend sufficiently into the capture chamber so as to substantially decrease the likelihood that flies trapped inside the chamber will land upon and climb up the outer side 27 of the upper portion 30 and discover the exit port 22 as a path of escape.

The different slopes also reduce the overall height of the passageway. A constant wall slope from entrance mouth to exit port would need to be of significantly greater height in order to achieve the large mouth/sharp slope optimum, which would in turn increase the total height of the catcher 10.

The overall rectangular shape of the catcher 10 is not critical to its function. The catcher may be cylindrical or spherical in shape and function equally well. Likewise, surrounding walls 20, 21 of pyramidal or similarly tapered shapes are also effective.

A hook or loop may be fixed to the top surface of the ceiling 42 of the capture chamber which would permit the catcher to be suspended in mid-air rather than rested upon a surface.

There is thus provided an unusual and new and beneficial arrangement of elements for a fly catcher. The releasible mating relationship between the passageway 12 and the capture chamber 14 is especially noteworthy and allows for easy cleaning of the catcher. Except for the minimal outer side of the upper conical portion 30, no other surface apart from the chamber is exposed to contact with captured dead flies.

The fly catcher of the invention is useful also for catching flying insects or pests other than houseflies, as will readily be recognized.

Those skilled in the art will also readily recognize that this invention may be embodied in still other specific forms than illustrated without departing from the spirit or essential characteristics of it. The illustrated embodiment is therefore to be considered illustrative and not restrictive, the scope of the invention being indicated by the appended claims rather than the foregoing description; and all variations that come within the meaning and range of equivalency of the claims are intended to be embraced thereby.

That which is claimed is:

1. A fly catcher comprising:

a vertically-oriented tapered passageway forming a fly guidance path and defined by a surrounding wall having upper and lower portions and an outer side, said upper and lower portions of said passageway being conical and united together with a common vertical axis, said upper and lower conical portions being united together at a juncture, the slope of said surrounding wall of said upper conical portion being more vertical than the slope of said surrounding wall of said lower conical portion, the surrounding wall of said upper portion comprising screen material, said passageway having top and bottom openings defining the height of said passageway, said top opening being an exit port at the top end of the upper portion of said passageway, said exit port having a minimum width in all directions sufficiently large to permit movement of a fly therethrough but not exceeding about one centimeter in any direction, said bottom opening of said passageway being an entrance mouth at the bottom end of the lower portion of said passageway, said entrance mouth having a width of at least about 10 centimeters in all directions, means for supporting said entrance mouth in an elevated condition to allow flies to move from an external location through said entrance mouth into said passageway, a capture chamber having an interior for confining flies therewithin and having a substantially horizontal interior floor with an aperture therein through which the upper portion of said passageway extends so that the juncture of said upper and lower portions lies substantially in the plane of said floor and said exit port is spaced above said floor and a fly-impenetrable interface is formed between said aperture and the outer side of said passageway, said lower portion of said passageway being below and outside said capture chamber so that said entrance mouth of said passageway is spaced below said floor, the width of said mouth being larger than the width of said aperture, and capture chamber support means for removably supporting said chamber such that said chamber may be lifted off and entirely separated from said passageway and said chamber support means for cleaning purposes.

2. The fly catcher of claim 1 wherein the slope angle formed between said vertical axis and said upper conical portion lies in the range of about 10 to 20 degrees and the slope angle formed between said vertical axis and said lower conical portion lies in the range of about 25 to 50 degrees.

3. The fly catcher of claim 1 wherein the surrounding wall of said lower conical portion comprises screen material.

4. The fly catcher of claim 3 wherein said lower conical portion includes a continuous layer of material having an inner continuous surface and said screen material forms a lining on said inner continuous surface.

5. The fly catcher of claim 1 wherein said capture chamber includes a ceiling spaced above said floor and the distance between said floor and said ceiling defines the height of said chamber, the distance that the upper portion of said passageway extends into said chamber being at least about 20% and not more than about 80% of the height of said chamber.

6. The fly catcher of claim 5 wherein said height of said passageway is within the range of about 75% to 125% of the height of said chamber.

7. The fly catcher of claim 1 wherein said capture chamber includes a ceiling spaced above said floor, said ceiling having a removable hatch integrated therein for access to the interior of said chamber.

8. The fly catcher of claim 1 additionally comprising a bait surface spaced below the entrance mouth of said passageway.

9. The fly catcher of claim 8 wherein the distance between said entrance mouth and said bait surface is within the range of about 25% to 60% of the width of said entrance mouth.

10. The fly catcher of claim 1 wherein the ratio of the said width of said entrance mouth to the width of said exit port is within the range of about 20:1 to 60:1.

11. The fly catcher of claim 1 wherein said capture chamber includes a ceiling spaced above said floor, said height of said passageway being within the range of about 75% to 125% of the distance between said floor and said ceiling.

* * * * *